United States Patent
Szukat et al.

(10) Patent No.: US 9,248,624 B2
(45) Date of Patent: Feb. 2, 2016

(54) REINFORCING FIBER SCRIMS AND METHOD FOR THE PRODUCTION THEREOF

(76) Inventors: Klaus Szukat, Parcent (ES); Fritz Scholten, Sausalito, CA (US)

(*) Notice: Subject to any disclaimer, the term of this patent is extended or adjusted under 35 U.S.C. 154(b) by 36 days.

(21) Appl. No.: 13/822,295

(22) PCT Filed: Sep. 15, 2011

(86) PCT No.: PCT/EP2011/004627
§ 371 (c)(1), (2), (4) Date: Mar. 12, 2013

(87) PCT Pub. No.: WO2012/034699
PCT Pub. Date: Mar. 22, 2012

(65) Prior Publication Data
US 2013/0177735 A1    Jul. 11, 2013

(30) Foreign Application Priority Data

Sep. 15, 2010 (DE) ............... 10 2010 045 424
Nov. 3, 2010 (EP) ...................... 10014235

(51) Int. Cl.
| | |
|---|---|
| B32B 5/12 | (2006.01) |
| B29C 70/20 | (2006.01) |
| B29C 70/24 | (2006.01) |
| B29C 70/50 | (2006.01) |
| B32B 5/02 | (2006.01) |
| B32B 37/02 | (2006.01) |
| B29C 70/22 | (2006.01) |
| B29C 65/00 | (2006.01) |

(52) U.S. Cl.
CPC .............. *B32B 5/12* (2013.01); *B29C 70/202* (2013.01); *B29C 70/24* (2013.01); *B29C 70/504* (2013.01); *B32B 5/028* (2013.01); *B32B 37/02* (2013.01); *B29C 66/721* (2013.01); *B29C 70/228* (2013.01); *Y10T 156/1712* (2015.01); *Y10T 428/24124* (2015.01)

(58) Field of Classification Search
CPC .......... B32B 5/12; B32B 37/02; B32B 5/028; B29C 70/504; B29C 70/228; B29C 66/721; B29C 70/202; Y10T 428/24124
USPC ......................................... 428/113; 156/543
See application file for complete search history.

(56) References Cited

U.S. PATENT DOCUMENTS

| | | | | |
|---|---|---|---|---|
| 5,688,577 A | * | 11/1997 | Smith et al. ................ | 428/113 |
| 5,809,805 A | * | 9/1998 | Palmer et al. ............... | 66/84 A |
| 2003/0148082 A1 | | 8/2003 | Bompard | |

FOREIGN PATENT DOCUMENTS

EP    1719609 A2    11/2006

*Primary Examiner* — Aaron Austin
*Assistant Examiner* — Jasper Saberi
(74) *Attorney, Agent, or Firm* — Michael Soderman

(57) ABSTRACT

The invention relates to reinforcing fiber scrims, comprising multi-layer, multiaxial scrims, which each comprise individual fibers arranged next to each other in a layer, wherein at least two layers are at an angle to one each other in the layer plane and are connected by a fixing means. To improve the processing of the multiaxial scrims and significantly reduce the processing time, at least two prefabricated MD scrims are arranged at an angle in a layer plane and connected to each other. Thus a reinforcing fiber scrim is provided, which has at least two individual fiber scrims and which, for a 0° position of the individual MD scrims, has six individual fiber scrims. The number of MD scrims arranged one over the other can be arbitrarily increased so that an increased layer structure is already present when the reinforcing fiber scrim is produced.

15 Claims, 3 Drawing Sheets

REINFORCING FIBER SCRIMS AND METHOD FOR THE PRODUCTION THEREOF

CROSS REFERENCE TO RELATED APPLICATIONS

This application is the U.S. national stage of International Application No. PCT/EP2011/004627, filed on Sep. 15, 2011, and claims the benefit thereof. The international application claims the benefits of German Application No. 102010045424.9 filed on Sep. 15, 2010, and European Application No. 10014235-5 filed on Nov. 3, 2010; all applications are incorporated by reference herein in their entirety.

BACKGROUND

The invention relates to reinforcing fiber scrims, comprising multi-layer MD scrims (multiaxial scrims), which each comprise fibers arranged next to each other in a layer, wherein at least two layers are at an angle to one another in the layer plane and are connected by a fixing means.

So-called multiaxial scrims consisting of carbon fibers, for example, are used wherever extreme tensile strength is required and the weight should be as small as possible. That is why multiaxial scrims for the intended components are put into a mold after they are finished and subsequently filled out with a synthetic resin, for instance epoxy resin. Workpieces can consequently be manufactured that can take on any arbitrary shape in a single piece. Strength that is far superior to other materials is achieved in connection with this because of the fibers that are used. The strength characteristics can be significantly increased because of the special nature of the carbon fibers, so the multiaxial scrims can be used in more and more areas. Typical examples of use are as boat hulls and as installed components and superstructures in boot and ship construction. Furthermore, the multiaxial scrims can be used for wing and tail-assembly skins and fuselage shells in aircraft construction. Even for helicopters, the multiaxial scrims can be used for the construction of the rotor blades. Moreover, the possibility exists in the construction of vehicles to replace a wide range of parts of the vehicle components with molded components that consist of resinified multiaxial scrims.

A series of advantages involving, for instance, the fact that greater payload amounts with lower fuel consumption can lead to higher economic efficiency due to the low unladen weight can consequently be obtained because of the high structural strength with a low component weight, especially in vehicle and aircraft construction. The use of multiaxial scrims makes a real contribution towards the solution of ecological and economic problems as far as that is concerned. It is necessary to arrange a number of multiaxial scrims on top of one another due to the fact that compliance has to be kept with a specified material thickness in some cases.

Manufacturing multiaxial scrims in such a way that two individual scrims, each comprising individual fibers arranged next to each other in a layer, are to be folded together or wrapped at an angle of 45° as an example, was previously known with regard to this. As an alternative, the possibility exists to arrange a 0° layer in the longitudinal direction of the multiaxial scrims in addition to the two +/−45° layers.

Connecting the multiaxial scrims that are individually folded together by means of a sewing technique or a gluing technique is known with regard to this. In so far as multiaxial scrims are sewed together, special machines are required that need a substantial amount of time for the sewing. It turned out here, as a further drawback, and in fact for later use, that the manufacturing-related gaps between the scrims to be sewn lead to instability in the sewn area. This drawback does not arise when the individual fibers are arranged next to one another without gaps and are connected to one another via adhesive threads or an adhesive mesh so that they can no longer shift in the positions that have been established. Dense fiber networks that can only be penetrated with difficulty by the resin to be added arise because of that as a rule, however. On the other hand, it was noted that gaps that improve penetration of the resin arise between the individual fiber because of the insertion channels brought about during sewing. A combination of both methods could certainly be useful depending on the subsequent application, in order to obtain the required strength values, on the one hand, but to simultaneously ensure that the resin materials that are used can penetrate into all of the layers of the scrims. Alternatively, one or the other of the variants can be used depending on the intended purpose.

The multiaxial scrims can be manufactured via a cutting/folding technique, but also via a wrapping technique in which at least two tapered fiber bundles are wrapped up at a wrapping angle of +/− 45° vis-a-vis one another, for example. A possibility exists with regard to this of providing the individual scrims with adhesive threads or adhesive meshes so that the further fibers that are put on the first scrim are connected with it.

The above-mentioned processes consequently make it possible to manufacture multiaxial scrims that consist of two individual layers as a rule, or three layers if necessary, and that are called MD scrims. Because of the existing thickness of the MD scrims, a number of individual work steps are required that have to be carefully performed, on the one hand, and that take up a great deal of time, on the other hand, to achieve the desired layer thickness and advantages.

SUMMARY

The invention is based on the problem of improving the processing of the multiaxial scrims and to significantly reduce the further processing time.

To solve the problem, the invention envisages that at least two prefabricated MD scrims are to be arranged at an angle to one another in the layer plane and connected to one other.

Further advantageous design forms of the invention follow from the sub-claims.

DETAILED DESCRIPTION

To simplify the further processing of the multiaxial scrims and to significantly reduce the individual work steps that are required, the invention takes the starting point of arranging several MD scrims at an angle in the layer plane and connecting them with one another, so that multi-layer scrims arise that increase the already existing advantages of MD scrims of a simple type, on the one hand, and, moreover, further increase the strength values because of the different MD scrims crossing one another. The possibility arises to substantially shorten the further processing because several multiaxial scrims are already arranged on top of one another and connected with one another. The reinforcing fiber scrims that are available in this way can be directly used in part or, if a specified material thickness is required, put on top of one another and connected to one another in the appropriate quantities, so that the reinforcing fiber scrims only have to be put into the desired shape and subsequently reinforced with a resin.

That is why a further design form of the invention envisages that two or more MD scrims are put on top of one another and connected to one another in the specified manner. Because of the choice of a wrapping angle of +/−45°, possibly 0°/90° and +/−45°, for example, each of the individual MD scrims already has the required strength values here, and they are virtually independent of the direction. When the individual MD scrims are arranged further on at an angle of +/−45° vis-a-vis one another, for instance, there is an alignment of the individual fibers in the reinforcing fiber scrims with several preferred directions, so there is a positive influence on the tensile-strength behavior. If several sets of MD scrims are used, individual layers could naturally take on the same direction in connection with this; they are alternately arranged in further layers as a rule, and this gives the overall reinforcing fiber scrims roughly the same tensile-strength characteristics, also distributed over the thickness. In the simplest case, the reinforcing fiber scrims are made of two MD scrims at an angle of 45° to one another. Alternatively, the possibility exists to put lower +/−45° MD scrims together with further 0°/90° MD scrims and upper +/−45° MD scrims. 6 individual layers consequently result. In the case that several of these reinforcing fiber scrims have to be arranged on top of one another to obtain an appropriate thickness, reinforcing fiber scrims with a total of 4 sets of MD scrims can be used to avoid a situation in which two identical layers are directly on top of one another. The arrangement here is such that the lowest layer consists of one set of +/−45° MD scrims, 0°/90° MD scrims are put on top of that, and then +/−45° MD scrims again, upon which 0°/90° MD scrims are laid once again. These reinforcing fiber scrims with a total of 4 sets of MD scrims can consequently be arbitrarily combined with further reinforcing fiber scrims without two identical sets of MD scrims lying on top of one another.

The individual fiber directions can be classified as follows in connection with this. Uniaxial scrims are assumed in the simplest case with a 0° layer. Biaxial scrims arise when two sets of scrims are arranged at a 45° angle vis-a-vis one another, for instance wrapped up or placed in that way. Triaxial scrims exist when a layer at 0° or possibly 90° is added to the biaxial scrims. If several sets of MD scrims are arranged at a 45° angle vis-a-vis one another, quadraxial scrims or hexaxial scrims can be assumed, depending on the number of layers used. Quadraxial scrims have two layers of MD scrims with a total of at least four layers here, whereas the hexaxial scrims, in contrast, have three sets of MD scrims with a total of at least six layers. If the individual sets of MD scrims have a 0° layer, the number of layers is increased to 6 or 9, as the case may be.

The invention involves, as far as this is concerned, multi-layer reinforcing fiber scrims that essentially consist of wrapped, multidirectional, two-layer MD scrims at +/−45°, which are combined with similar MD scrims at an angle of +45° to −45° or 0° to 90°, for instance. As an example, the above-mentioned reinforcing fiber scrims can be arranged in this way with three or four sets of MD scrims on top of one another at +45°, 0°/90° and −45° or +45°, 0°/90°, −45° and 0°/90°, so that a total of six or, as the case may be, eight layers exist in accordance with the above-mentioned specifications of hexaxial scrims. If, for instance, 3-layer MDs are used as a pre-product) (+45°/0°/−45° a total layer quantity with +45°/0°/−45°, 0°/45°/90°, +45°/0°/45° and 0°/45°/90° results with a first layer in the longitudinal direction, a second layer in the crosswise direction, a third layer in the longitudinal direction and a fourth layer in the crosswise direction. Further variants can be derived from the description above.

These layers can preferably be manufactured in a single work step in connection with this, however, and do not have go to a further work step after completion of the MD scrims. The special advantage of these reinforcing fiber scrims is that the tensile forces that arise can be absorbed in a significantly better way after production than is the case with simple UD scrims or MD scrims, because extensive, quasi-isotrope stability exists.

Furthermore, fraying at the edges is avoided; the possibility exists to trim the side edges after the production of the reinforcing fiber scrims, if desired.

Adhesive fiber meshes, a spray adhesive or a powder adhesive, which connects the individual fibers to each other as a hot adhesive, hot-melt or adhesive dissolving during hardening in the further processing, is used to fix the individual fiber layers in place vis-a-vis one another. This connection possibility exists both between the individual fiber layers of the MD scrims and likewise between the individual MD scrims when they are individually wrapped and put on top of one another at a later point in time. If the complete reinforcing fiber scrims are wrapped in one work step, however, the individual fiber layers can each be connected to one another in the above-mentioned way.

The fibers that are used preferably consist of carbon, but glass fibers, aromatic polyamide fibers, polyester fibers, silicon carbide fibers, basalt fibers, polyethylene fibers or natural fibers, such as hemp, sisal, coconut or flax, can be used.

A device is envisioned to manufacture the multi-layer scrims, especially the reinforcing fiber scrims, in which a continuous web of MD scrims with alternating placement angles of the fibers can be set down on one another to form the areas of fabric on a conveyor device that moves continuously or intermittently forward in the longitudinal direction. The device consists of a conveyor device as far as this is concerned on which the multiaxial scrims can be set down in a continuous web in the longitudinal direction. The conveyor equipment does not move continuously, but instead intermittently, depending on the laying and production progress; initial MD scrims are set down on the conveyor equipment in the direction of transport from a supply roll to start with. After the defined transport length is reached, the conveyor device comes to a standstill and further MD scrims are fed to the conveyor belt from the supply roll at an angle, preferably 45° (135°), and set down on the MD scrims that were previously lying in the longitudinal direction.

A laid-down web of MD scrims, now at an angle, with the fiber angles of 0 or 90° in the direction of transport arises via a traction-halting and cutting device. After that, the conveyor equipment moves the laid-down, crosswise web width forwards in the direction of transport and the next MD scrims are set down in an overlapping fashion in the manner described above. Consequently, two MD scrim webs already exist. Further MD scrims can be added in a case of that type via a further supply roll if desired. Two times two, three times two or four times two MD scrim arrangements consequently arise that extend at an angle of +/−45°, 0°/90°, +/−45° or 0°/90°, +/−45°, 0°/90° and +/−45°.

The individual MD scrims are fixed in place vis-a-vis one another with the aid of a calender with a double roller or an absorbent conveyor with the possibility of a heating effect after an adhesive fiber mesh, a spray adhesive, an adhesive nonwoven fabric, a matted adhesive fabric or a powder adhesive, for instance, have been previously inserted between the individual layers. The double rollers of the calender or of the absorbent conveyor can be designed in such a way here that they make it possible to take down the MD scrims to support the further transport process.

Alternatively, or in addition to the use of a calender, the possibility exists to sew up an arrangement of the individual layers with one another with the aid of a needle bar; the type of sewing can be predetermined depending on the type of intended use, for example with a sewing head operating in 3 dimensions as well. Multi-layer MD scrims, the so-called reinforcing fiber scrims, are obtained as an end product that can be further processed in a simple form and that has an extremely smooth and continuous arrangement of the individual fibers on the outside and inside for all application areas in industry. The special advantage of this production possibility is that the end product, and in fact the reinforcing fiber scrims, can be manufactured with a relatively high speed of >400 m/h, and this makes a significant contribution towards reducing costs. Furthermore, it is to be pointed out in connection with this that the specified angle figures of +/−45° are flexible.

Different wrapping angles are possible, of course, and reference is only made to an angle of +/−45° as an example.

Edge reinforcements running in the longitudinal direction along the edges can be attached to avoid fraying of the edges of the multi-layer MD scrims that are manufactured in this way. Moreover, additional streaky adhesive bonds or a heat seal can be applied to the edges with the corresponding equipment if this is required for further processing.

A special design form of the invention envisages that the conveyor device will have a width double that of the individual MD scrims and that there can be a multiple arrangement of the MD scrims with a double width and with overlapping in the longitudinal direction. Because of the double width of the conveyor device, a possibility is created in connection with this to deviate from the customary standard dimensions of the MD scrims and to use them in a multiple arrangement next to one another so that large fabric areas will also arise for the reinforcing fiber scrims in accordance with the invention. The conveyor device can be adjusted in its width in this case to the width of the MD scrims so that two sets of scrims can each be arranged next to one another, for example. The possibility of applying more than two sets of scrims also exists, of course, if the widths of the MD scrims are smaller.

BRIEF DESCRIPTION OF THE DRAWINGS

The invention will be explained in more detail below with the aid of the figures.

DETAILED DESCRIPTION OF THE PREFERRED EMBODIMENT

Figure 1:
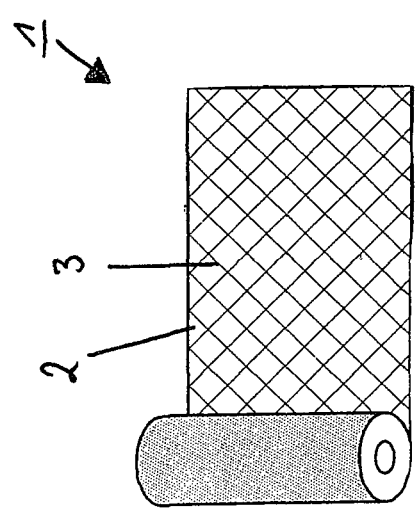
FIG. 1 shows an individual set of MD scrims in a perspective view.

FIG. 1 shows an individual set of MD scrims 1, which consist of two individual fiber layers 2, 3, in a perspective view. The individual fiber layers 2, 3 are arranged at an angle of roughly 45° vis-a-vis one another so that a rhombic pattern arises. The individual fiber scrims 2, 3 are connected to one another with adhesive agents here and are led during production through a calender, for instance, so that the fiber scrims 2, 3 are pressed together with an adequate fixation of the individual fibers. In an alternative design, a fiber layer can additionally be added to MD scrims 1 of this type at an angle of 0° so that an individual set of MD scrims could not only consist of two sets of fiber scrims 2, 3, but also of three sets of fiber scrims if need be.

Figure 2:
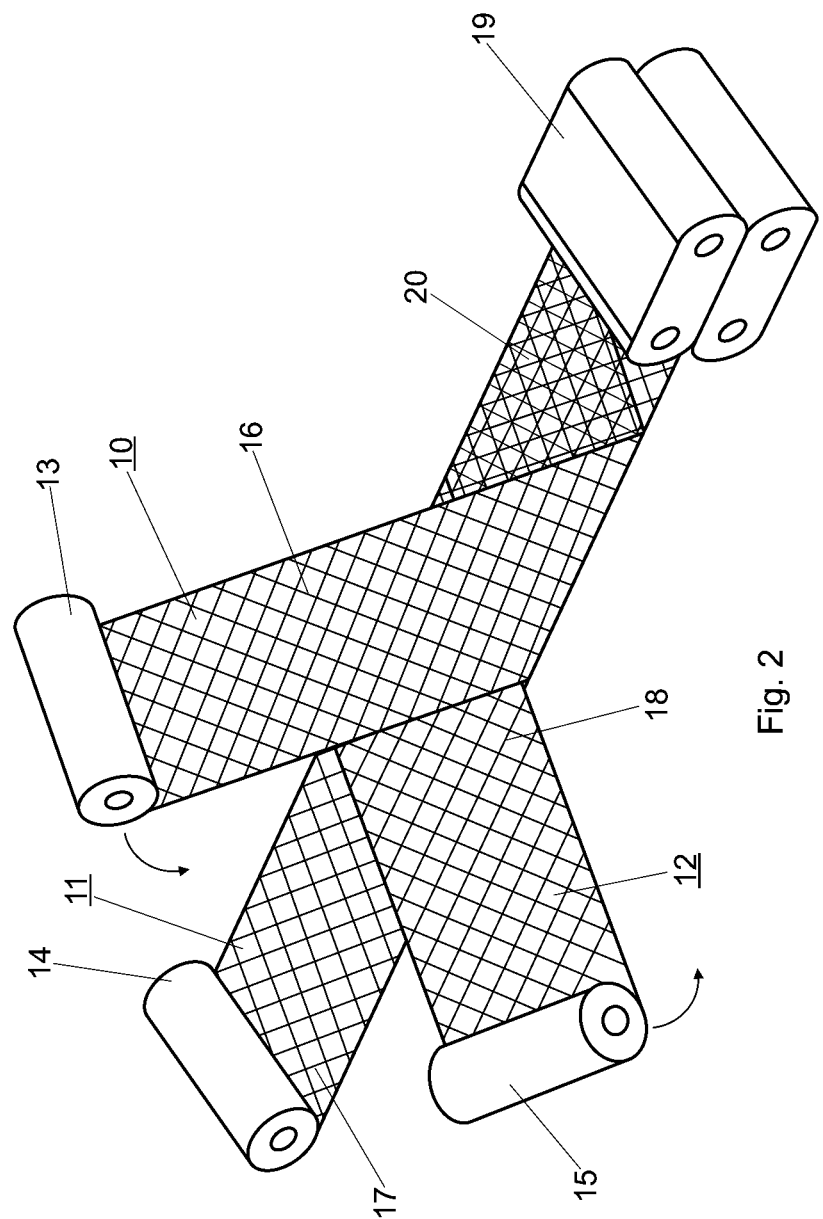
FIG. 2 shows reinforcing fiber scrims made up of three sets of MD scrims, for example, in a perspective view

FIG. 2 shows the arrangement of the individual MD scrims for the production of reinforcing fiber scrims 20 in a perspective view. For clarity, only the individual MD scrims 10, 11, 12 are shown in the form of a wound-up roll 13, 14, 15 and a rolled-out MD scrim section 16, 17 and 18, along with a calender unit 19. The individual MD scrims 10, 11, 12 are fed in at a wrapping angle here so that the individual fiber scrims of the MD scrims 10, 11, 12 cross over one another. In the example that is shown, one layer of the MD scrims 11 runs directly in the direction of transport, a second set of MD scrims 10 is added to this at an angle of roughly 45° and a third set of MD scrims 12 is added at an angle of roughly −45°. Only the three sets of MD scrims 10, 11, 12 that are put together lead to the reinforcing fiber scrims 20. The reinforcing fiber scrims 20 are then fed into a calender unit 19, which consists of calender rollers or an absorbent conveyor, for instance. A bond is created between the individual sets of MD scrims 10, 11, 12 via the adhesive agent arranged between them with the aid of the calender rollers or the absorbent conveyor, with or without a heating effect.

Figure 3:
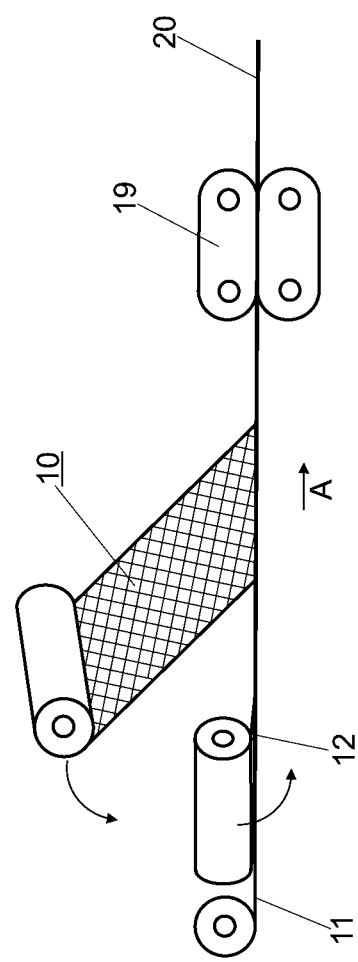
FIG. 3 shows the arrangement of reinforcing fiber scrims known from FIG. 2 from a side view.

FIG. 3 shows the arrangement known from FIG. 2 in a side view. The three sets of MD scrims 10, 11, 12 are fed in at a wrapping angle vis-a-vis the direction of transport A and are finally pressed into reinforcing fiber scrims 20 through a calender unit 19.

Alternatively, the possibility exists to create reinforcing fiber scrims 20 by feeding in two sets of MD scrims at a wrapping angle of +/−45° or three sets of MD scrims at 0° and +/−45°. As a further alternative, the possibility exists of providing the lowest set of MD scrims with a feed-in angle of 0°, a second set of MD scrims with +45°, a further set of MD scrims with 0° or 90° and a final set of MD scrims with −45°. The upper and lower layers each have a different wrapping angle in an arrangement of that type, so several of these reinforcing fiber scrims 20 can subsequently be put on top of one another without MD scrims with the same preferred direction lying on top of one another.

List of Reference Numerals
1 MD scrims
2 Fiber layer
3 Fiber layer
9 Calender unit
10 MD scrims
11 MD scrims
12 MD scrims
13 Roll
14 Roll
15 Roll
16 MD scrim section
17 MD scrim section
18 MD scrim section
19 Calender unit
20 Reinforcing fiber scrims
A Direction of transport

The invention claimed is:

1. Reinforcing fiber scrims (20), comprising multi-layer MD scrims (multiaxial scrims; 10, 11, 12), which each comprise individual fibers arranged next to one another in a layer, wherein at least two layers are at an angle vis-a-vis one another with respect to the longitudinal extension of the layer plane and are connected by a fixing means, characterized in that at least two prefabricated instances of multi-layer MD scrims (10, 11, 12) are arranged at an angle vis-a-vis one another with respect to the longitudinal extension of the multi-layer MD scrims and connected to one another, wherein the multi-layer MD scrims are wrapped together to form the reinforcing fiber scrims such that at least one of the prefabricated instances of multi-layer MD scrims covers one side of the reinforcing fiber scrims proximate to one longitudinal edge and covers the other side of the reinforcing fiber scrims that is proximate to the other longitudinal edge.

2. Reinforcing fiber scrims (20) according to claim 1, characterized in that
two, three or four instances of multi-layer MD scrims (10, 11, 12) are connected with one another while lying on top of one another.

3. Reinforcing fiber scrims (20) according to claim 1, characterized in that
the individual instances of multi-layer MD scrims (10, 11, 12) lie on top of one another at an angle of 45° in each case.

4. Reinforcing fiber scrims (20) according to claim 1, characterized in that
the individual fiber layers of the multi-layer MD scrims (10, 11, 12) have an angle of +/−45° and/or 0°/90° vis-a-vis the longitudinal extension of the multi-layer MD scrims (10, 11, 12).

5. Reinforcing fiber scrims (20) according to claim 1, characterized in that
the fiber layers of the multi-layer MD scrims (10, 11, 12) comprise individual fibers arranged in parallel in a continuous fashion that are connected via an adhesive fiber mesh, a spray adhesive, a powder adhesive, in the form of a hot adhesive or as a hot melt, or are sewed together with one another.

6. Reinforcing fiber scrims (20) according to claim 1, characterized in that
the multi-layer MD scrims (10, 11, 12) are connected via an adhesive fiber mesh, a spray adhesive, an adhesive nonwoven fabric, a matted adhesive fabric or a powder adhesive, in the form of a hot adhesive or as a hot melt, or are sewed together with one another.

7. Reinforcing fiber scrims (20) according to claim 1, characterized in that
the fibers are comprised of carbon, glass, aromatic polyamide, polyester, silicon carbide, basalt, polyethylene or natural fibers, such as hemp, sisal, coconut or flax.

8. Apparatus for creating the reinforcing fiber scrims (20) of claim 1 comprising multi-layer MD scrims (multiaxial scrims; 10, 11, 12), comprised of:
means for moving a conveyor continuously or intermittently forward in the longitudinal direction,
means for setting down a continuous web of MD scrims (10, 11, 12) with alternating longitudinal placement angles of the MD scrims (10, 11, 12) onto the conveyor to form areas of fabric in such a way that
each multi-layer MD scrim comprises individual fibers arranged next to one another in a layer, wherein at least two layers are at an angle vis-a-vis one another in the layer plane and are connected by a fixing means, and wherein
at least two prefabricated sets of MD scrims (10, 11, 12) are arranged at an angle vis-a-vis one another in the layer plane and connected to one another.

9. Apparatus according to claim 8, characterized in that
the supply of the MD scrims (10, 11, 12) at an angle vis-a-vis the direction of transport (A) can be variably adjusted.

10. Apparatus according to claim 8, characterized in that
the MD scrims (10, 11, 12) are fed in at an angle of +/−45° and/or 0°/90°, wherein the individual MD scrims (10, 11, 12) are comprised for their part of individual fiber layers that have an angle of +/−45° or 0° and +/−45° vis-a-vis one another.

11. Apparatus according to claim 8, characterized in that
the MD scrims (10, 11, 12) are fed in at an angle of +/−45° vis-a-vis the direction of transport (A) and a middle layer of MD scrims (10, 11, 12).

12. Apparatus according to 8, characterized in that
the conveyor device has a width double that of the individual MD scrims (10, 11, 12) and there can be a multiple arrangement of the MD scrims (10, 11, 12) with a double width and with overlapping in the longitudinal direction.

13. Apparatus according to claim 8, characterized in that
the conveyor device is designed to be adjustable to the width of the MD scrims (10, 11, 12).

14. Apparatus according to claim 8, characterized in that
it is equipped on the end with a calender unit (19) and/or a sewing device.

15. Process for creating the reinforcing fiber scrims (20) of claim 1 comprising multi-layer MD scrims (multiaxial scrims; 10, 11, 12), comprised of the steps:
a) moving a conveyor continuously or intermittently forward in the longitudinal direction,
b) setting down a continuous web of MD scrims (10, 11, 12) with alternating longitudinal placement angles of the MD scrims (10, 11, 12) onto the conveyor to form areas of fabric in such a way that
each multi-layer MD scrim comprises individual fibers arranged next to one another in a layer, wherein at least two layers are at an angle vis-a-vis one another in the layer plane and are connected by a fixing means, and wherein
at least two prefabricated sets of MD scrims (10, 11, 12) are arranged at an angle vis-a-vis one another in the layer plane and connected to one another.

* * * * *